United States Patent [19]

Wallisch et al.

[11] Patent Number: 4,672,113

[45] Date of Patent: Jun. 9, 1987

[54] PROCESS FOR PURIFYING AQUEOUS DISTILLATION RESIDUES DURING THE TREATMENT OF LIQUIDS IN THE PREPARATION OF CELLULOSE ETHERS

[75] Inventors: Heinz Wallisch, Eltville; Uth H. Felcht, Bad Soden-Neuenhain; Michael Kostrzewa, Wiesbaden, all of Fed. Rep. of Germany

[73] Assignee: Hoechst Aktiengesellschaft, Frankfurt, Fed. Rep. of Germany

[21] Appl. No.: 644,940

[22] Filed: Aug. 28, 1984

[30] Foreign Application Priority Data

Sep. 5, 1983 [DE] Fed. Rep. of Germany ....... 3331997

[51] Int. Cl.[4] .................... C08B 11/00; B01D 13/00
[52] U.S. Cl. ........................ 536/85; 536/96; 203/47; 203/DIG. 25; 210/433.2; 210/650; 210/777; 159/47.1
[58] Field of Search ............... 203/47, DIG. 25, 91; 210/650, 651, 652, 777, 346, 637, 433.2; 159/47.3, 48.2, 47.1; 536/85, 96

[56] References Cited

U.S. PATENT DOCUMENTS

| | | | |
|---|---|---|---|
| 2,861,038 | 11/1958 | Steinmann et al. | 210/651 |
| 2,958,656 | 11/1960 | Stuckey | 203/91 |
| 3,347,855 | 10/1967 | Nelson | 260/231 |
| 3,669,879 | 6/1972 | Berriman | 210/652 |
| 3,872,015 | 3/1975 | Madsen | 210/346 |
| 3,903,076 | 9/1975 | Krumel et al. | 536/85 |
| 3,974,068 | 8/1976 | Ebner et al. | 210/23 |
| 4,000,065 | 12/1976 | Ladha et al. | 210/652 |
| 4,015,067 | 3/1977 | Liu et al. | 536/96 |
| 4,207,182 | 6/1980 | Marze | 210/650 |
| 4,249,000 | 2/1981 | Batzer et al. | 536/85 |
| 4,344,826 | 8/1982 | Smith | 210/652 |
| 4,404,370 | 9/1983 | Bernert et al. | 536/96 |
| 4,430,226 | 2/1984 | Hegde et al. | 210/650 |
| 4,435,289 | 3/1984 | Breslav | 210/433.2 |

FOREIGN PATENT DOCUMENTS

| | | | |
|---|---|---|---|
| 2357731 | 5/1975 | Fed. Rep. of Germany | 210/652 |
| 2510309 | 9/1976 | Fed. Rep. of Germany | 210/652 |
| 0122084 | 7/1983 | Japan | 210/652 |
| 1120373 | 7/1968 | United Kingdom | 536/85 |
| 2020300 | 11/1979 | United Kingdom . | |

OTHER PUBLICATIONS

Chemical Abstracts, "Treatment of Effluents . . . Pollution Control", vol. 89, No. 20, pp. 117–145, (Nov. 13, 1978).

"Ultrafiltration Hyperfiltration Dialyse", NADIR-Separations Membranen by Kalle; Folien.

"Membrane Filtration-The Ultrafiltration Module", Niro Atomizer.

Primary Examiner—S. Leon Bashore
Assistant Examiner—V. Manoharan
Attorney, Agent, or Firm—Schwartz, Jeffery, Schwaab, Mack, Blumenthal & Evans

[57] ABSTRACT

Disclosed is a process for the purification treatment of liquid reaction and/or washing media obtained in the preparation of cellulose ethers which comprises distilling and subsequently ultrafiltering the media. In the distilling step, the low-boiling organic by-products of the reaction, the residual, non-reacted, low-boiling organic reaction components and/or the optionally used organic solvents are separated in the form of a distillate. The aqueous distillation residue, which particularly comprises salts, a cellulose constituent and possibly medium and/or high-boiling organic by-products of the reaction and/or non-reacted organic reaction components, is thereafter subjected to ultrafiltration. Ultrafiltration results in a permeate, in which the COD values are, for example, reduced by about 20% by weight.

16 Claims, 2 Drawing Figures

PROCESS FOR PURIFYING AQUEOUS DISTILLATION RESIDUES DURING THE TREATMENT OF LIQUIDS IN THE PREPARATION OF CELLULOSE ETHERS

BACKGROUND OF THE INVENTION

The present invention involves a process for the purification treatment of liquid reaction and washing media obtained in the preparation of cellulose ethers, after organic solvents and/or other low-boiling organic components have been separated by distillation.

At present, cellulose ethers are frequently prepared by employing organic solvents, such as isopropanol, tertiary-butanol, acetone, dimethoxyethane or mixtures thereof, as dispersing auxiliaries in the process, as early as the alkalization step or not later than the etherification step. This applies, in particular, to the preparation of sodium carboxymethyl cellulose (NaCMC) or hydroxyethyl cellulose (HEC), which are intended to have the advantage of a particularly uniform substitution. To an increasing extent, also discussed is the use of organic solvents of this kind for the preparation of alkyl-hydroxyalkyl cellulose, for example, methyl-hydroxyethyl cellulose (MHEC).

Organic solvents, such as isopropanol or methanol, are likewise used in the treatment of crude (i.e., still unpurified) cellulose ethers, for example, in order to remove salts or other by-products of the reaction from the valuable cellulose ether product. As described in "Ullmanns Encyklopaedie der technischen Chemie" (Ullmann's Encyclopedia of Industrial Chemistry), Verlag Chemie-Weinheim 4th edition, volume 9, 1975, pages 192-212, keyword "Celluloseaether" (cellulose ethers), the etherification of cellulose is, however, accompanied by side-reactions (see, for example, page 201, right-hand column; page 202, left-hand column; page 205, left-hand column and page 206, right-hand column.) For example, these side-reactions include competitive reactions to the intended etherification resulting from hydrolysis of the etherifying agent or from the substitution of OH groups of the organic solvent or of by-products by the etherifying agent. These competitive reactions result in undesirable by-products. By-products which are obtained include, for example, methanol and dimethyl ether in the methylating reaction with $CH_3Cl$, glycolate ions (hydroxyacetate ions) in the carboxymethylation with monochloroacetic acid or the salts thereof, or ethylene glycol and polyethylene glycols in the hydroxyalkylation with alkylene oxides.

In view of the increasing importance of regulations mandating the least possible pollution of the environment by waste water, it is necessary to optimally purify waste waters before they are discharged into water systems. This applies particularly to waste waters containing organic by-products from chemical reactions, which have a high chemical oxygen demand (COD). In many cases, purification can already successfully be achieved by distillation of such liquid reaction and/or washing media; however, distillation only removes organic solvents, excess amounts of starting materials used, or by-products of the reaction, such as $CH_3Cl$, ethylene oxide, methanol, dimethyl ether or isopropanol, which are rather low-boiling, whereas high-boiling or non-volatile organic compounds remain in the distillation residue and consequently also in the waste water. Therefore, a very intensive search is being made for separation and purification processes which make possible the treatment of by-products of reactions, liquid reaction media and/or liquid washing media. In the prior art, the following processes have been disclosed in this connection:

In the process for producing alkali metal CMC according to German Offenlegungsschrift No. 1,518,576 (equivalent to U.S. Pat. No. 3,347,855), a water/acetone mixture is employed as the liquid medium during the alkalization and the etherification of the cellulose. After the reaction, the water/acetone mixture is separated from solid reaction products in a separator and transferred to an acetone recovery column. In this column, excess water is removed from the water/acetone mixture. The acetone is returned to the reaction cycle. No information is to be found concerning the treatment of the by-products of the reaction. Distillation is also mentioned in the description contained in Ullmann's Encyclopedia, referred to above, but this publication does not give any information concerning the treatment of by-products.

German Offenlegungsschrift No. 2,636,935 (equivalent to U.S Pat. No. 4,015,067) discloses a continuous process for preparing cellulose ethers, in which purification is carried out in such a way that the crude product is freed from its low-boiling constituents (by-products and excess etherifying agents) by steam distillation. These constituents can then be fractionated in a further still and, if desired, returned to the etherification process. As regards the treatment of the distillation residue obtained in each case, it is stated only that the residue from steam distillation (i.e., the crude cellulose ether which has been freed from low-boiling constituents) is filtered, washed, dried and ground.

According to German Offenlegungsschrift No. 3,118,915, the purification process for aqueous distillation residues produced during the treatment of liquids obtained in the preparation of carboxymethyl polysaccharides comprises separating these distillation residues into their components in ion exchangers. A process of this kind is, however, unsuitable in the case of distillation residues which result from production processes used for preparing non-ionic or mainly non-ionic cellulose ethers (particularly alkylhydroxyalkyl celluloses), since in that case compounds which are predominantly non-ionic have to be removed.

German Pat. No. 681,625 describes a process in which a cellulose ether, which is actually water-insoluble (MC or NaCMC), is first dissolved in an aqueous NaOH solution and is thereafter freed from the solubilizer (NaOH) by dialysis on a cellulose hydrate membrane.

SUMMARY OF THE INVENTION

It is therefore an object of the present invention to provide an economically and ecologically advantageous process for purifying the distillation residue from the distillation of liquids obtained in the preparation or purification of cellulose ethers.

Another object of the present invention is to provide a process of the type described above which results in a reduced chemical oxygen demand of the residue-containing waste water.

Yet another object of the present invention is to provide a process of the type described above which produces a higher yield of the cellulose ethers.

Therefore, in accordance with one aspect of the present invention, there has been provided a process for the purification treatment of liquid media comprising low-, medium-, and high-boiling organic by-products and low-, medium-, and high-boiling, residual, non-reacted organic reaction compounds. and/or washing media produced during the preparation of cellulose ethers from cellulose, an alkali metal hydroxide and at least one etherifying agent in a medium comprising water and, if appropriate, at least one organic solvent, comprising the steps of separating by distillation the low-boiling organic by-products of the reaction and the residual, non-reacted, low-boiling organic reaction components from the liquid media, the liquid media comprising an aqueous distillation residue, and treating the aqueous distillation residue by ultrafiltration.

In a preferred embodiment, the ultrafiltration treatment step comprises passing the aqueous distillation residue over at least one round plate module for separating the residue into a permeate, having a reduced COD value, and a concentrate substantially comprising undesirable salts and the cellulose constituent. The ultrafiltration treatment step can be performed continuously or discontinuously, and in both the residue is separated into a permeate stream having a reduced COD value and a concentrate stream which substantially comprises undesirable salts and cellulose.

In another aspect of the present invention, there has been provided a process for the production of a cellulose ether, comprising the steps of reacting cellulose, an alkali metal hydroxide and at least one etherifying agent in a medium comprising water and/or at least one organic solvent, separating by distillation the low-boiling organic by-products of the reaction and the residual non-reacted low-boiling organic reaction components from the liquid media, the liquid media comprising an aqueous distillation residue and treating the aqueous distillation residue by ultrafiltration.

In a preferred embodiment, the process is directed to the production of an alkyl hydroxyalkyl cellulose, the alkyl component comprising either 1 or 2 carbon atoms and the hydroxyalkyl component comprising from 2 to 4 carbon atoms.

Further objects, features and advantages of the present invention will become apparent from the detailed description of preferred embodiments which follows.

DETAILED DESCRIPTION OF PREFERRED EMBODIMENTS

Figure 1:
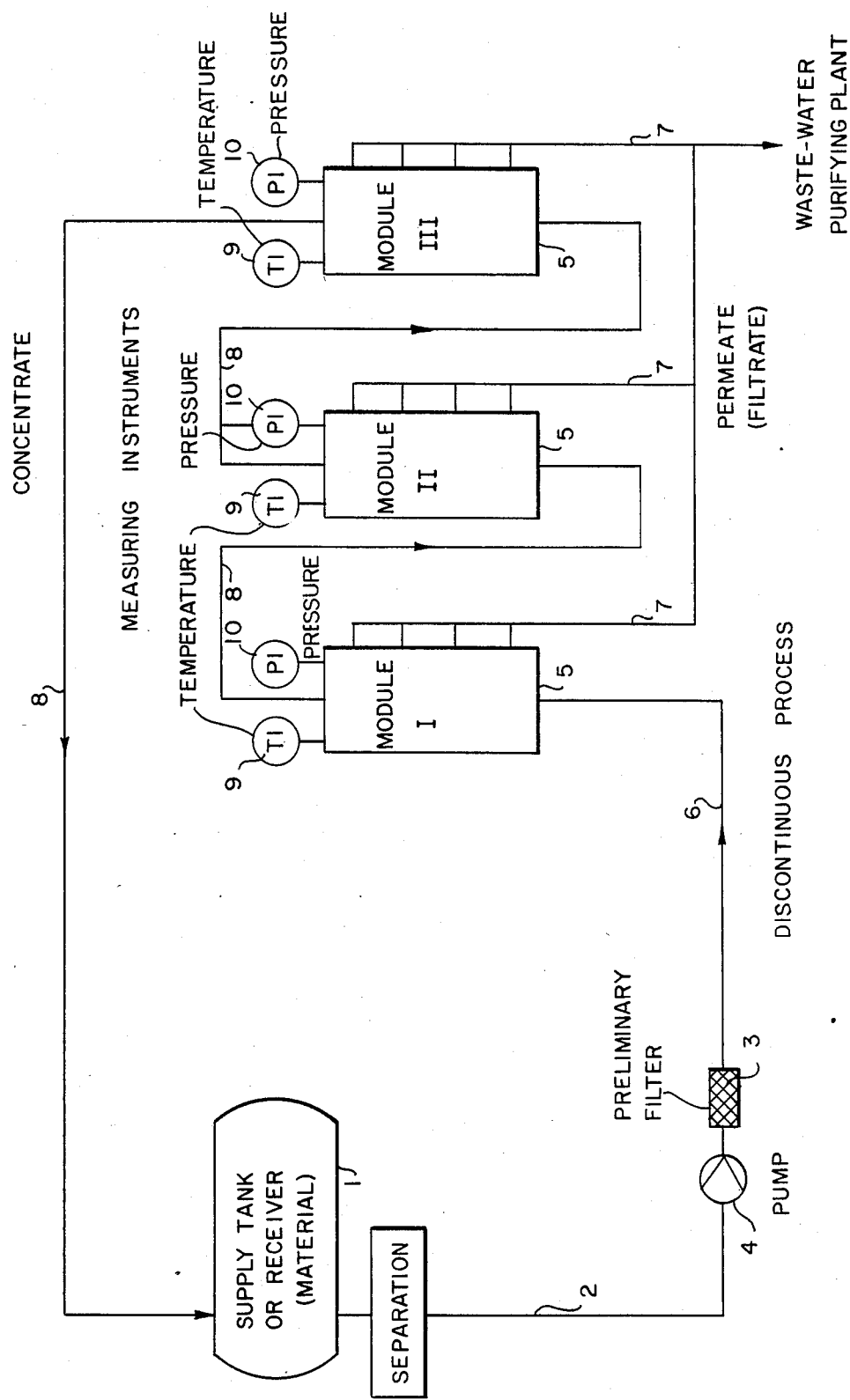
FIG. 1 is a flow diagram of a discontinuous process according to one embodiment of the present invention.

The present invention is based on a process for the purification treatment of liquid reaction and/or washing media obtained in the preparation of cellulose ethers from cellulose, an alkali metal hydroxide and at least one etherifying agent, in a medium comprising water and, if appropriate, at least one organic solvent. In the process, the low-boiling organic by-products of the reaction, the residual non-reacted low-boiling organic reaction components and/or the optionally employed organic solvents are separated from the liquid media by distillation. The process of the present invention is characterized in that the aqueous distillation residue is treated by ultrafiltration. The term "low-boiling" means that these substances have boiling points below the boiling point of water of 100° C. or that they are carried over in the distillation procedure below the boiling point of water, if they are constituents of azeotropes.

Concerning the technology of ultrafiltration and the materials and equipment used in the ultrafiltration process, reference is made to "Ullmann's Encyclopedia of Industrial Chemistry", Verlag Chemie-Weinheim, 4th edition, volume 16, 1978, keyword "Membranen" (membranes), pages 515–535 (in particular) page 528, right-hand column through page 529, right-hand column.) Ultrafiltration equipment and ultrafiltration processes are also described in German Auslegeschrift No. 2,203,008, Swiss Pat. No. 542,639 (equivalent to U.S. Pat. No. 3,872,015), U.S. Pat. No. 3,974,068, German Auslegeschrift No. 2,808,022 and German Pat. No. 2,945,317. However, none of these publications mentions the specific problem of purifying liquid reaction and/or washing media from the preparation of cellulose ethers or the combination of a distillation stage with an ultrafiltration stage.

In a preferred embodiment of the process according to the present invention, the aqueous distillation residue which is present before carrying out ultrafiltration comprises salts, a cellulose constituent and possibly high-boiling organic by-products of the reaction and/or non-reacted organic reaction components. The cellulose ether is, in particular, of a non-ionic type, for example, hydroxyalkyl($C_2$ to $C_4$) cellulose, alkyl($C_1$ and $C_2$) cellulose or a mixed ether thereof, or of a type which substantially comprises, i.e., particularly more than about 75% by weight, one of the above-indicated substituents, but which also comprises a lower amount, i.e., particularly up to about 25% by weight, of ionic substituents, for example, carboxyalkyl($C_1$ or $C_2$) groups, N,N-dialkyl($C_1$ to $C_3$)-aminoalkyl($C_1$ to $C_4$) groups, phosphonomethyl groups or sulfonoethyl groups. The cellulose ether preferably comprises an alkyl($C_1$ and $C_2$)-hydroxyalkyl($C_2$ to $C_4$) cellulose, the preparation of which utilizes methyl chloride or ethyl chloride and ethylene oxide, propylene oxide and/or butylene oxide as etherifying agents.

The membrane material which is employed in the ultrafiltration process according to the present invention particularly comprises a polyether sulfone, i.e., a polymer produced from p-phenylene units, the units of which are alternately linked by sulfone groups or ether groups and which is very stable through a pH range from 1 to 14. Other materials are, however, also suitable, provided they meet predetermined requirements.

In the process of the present invention, a round plate module is, for example, used, which substantially comprises a stack of support plates (particularly circular support plates) and guide plates, which are alternately stacked one on top of the other and clamped between two end plates. The support plates are covered with draining layers and membranes on both surfaces and have central bores which form a passage for water. The guide plates serve to convey the raw water. An "RP-Module" manufactured by GKSS-Forschungszentrum Geesthacht GmbH, Hamburg, Federal Republic of Germany, has, for example, proved to be suitable in the process. Comparable apparatus are, for example, supplied by Forschungsinstitut Berghof GmbH, Tuebingen, Federal Republic of Germany or A/S De Danske Sukkerfabrikker, Nakskov, Denmark. Other suitable modules include wound (spiral-type) modules or tubular modules.

The process of the present invention represents an important stage in one of the large-scale production processes for cellulose ethers. As an illustrative example, a methyl-hydroxyethyl cellulose (MHEC) has been chosen. The MHEC is prepared from cellulose, methyl chloride, ethylene oxide, and an aqueous NaOH solution, if appropriate, in the presence of an inert organic solvent, such as dimethoxyethane. During reaction and after washing of the crude MHEC with hot water, the following products, in particular, are obtained in the liquid reaction and washing medium: NaCl, methanol, dimethylether, lower and higher-molecular weight partially methylated ethylene glycols, methyl chloride, ethylene oxide, an organic solvent, if present, for example, dimethoxyethane, and a cellulose constituent comprising cellulose molecules, in which substitution possibly is either too low or too high, or comprising cellulose ethers in which the chain length is insufficient. After the preparation and/or purification of other types of cellulose ethers a comparable composition may be obtained, comprising, for example, other salts, such as sodium acetate or sodium nitrate, other organic solvents, such as ethanol, isopropanol, acetone or diethylether, propylene glycols, etc. After the separation of the solid residue (substantially comprising the valuable cellulose ether, which may still contain certain salt constituents), the liquid reaction and washing medium is first subjected to a distillation procedure, in which the low-boiling organic by-products of the reaction, such as methanol, dimethylether, ethylene glycol, the non-reacted, low-boiling organic reaction components (which are normally used in molar excess), such as methyl chloride and ethylene oxide, and the optionally used organic solvents, such as dimethoxyethane, are distilled off and can, for example, be separated into the individual components by fractional distillation.

The ultrafiltration process is thereafter performed on the residue from the distillation procedure, which (based on the above-indicated example) substantially comprises NaCl, a cellulose constituent and medium- and higher-molecular weight ethylene glycols and medium- and higher-molecular weight ethylene glycol derivatives, respectively. Ultrafiltration can be performed in a discontinuous or continuous process. In the discontinuous process, one or several ultrafiltration modules may be used, with a receiver being positioned upstream of the modules. The permeate which is drained from the module(s) and which has a reduced COD value (i.e., a lower solids content) is collected and can be fed to the waste-water purifying plant. In the final stage of the process, the concentrate which is obtained in the present case substantially comprises NaCl and a cellulose constituent, for example, in approximately equal proportions. When the concentrate has left the first module, it is introduced into a second module, if present, which is optionally followed by even further modules. Upon leaving the last module, the concentrate is returned to the receiver and the process is continued until an intended final concentration of the concentrate has been attained. Concentration should, however, not be raised to a level which is too high, since with increasing concentration the retained amount of compounds accounting for the COD value decreases and practically approaches zero at concentrations in the range from about 1:20 to 1:27, i.e., at these high concentrations, the COD values of the permeate approximately re-approach the COD value of the initial waste water. In the regeneration of the membranes used in the process, conventional purifying agents, for example, aqueous solutions of citric acid or nitric acid, may be employed. The process of the present invention makes it possible to reduce the COD values by about 3 to 5 g of oxygen per liter. In the continuous process, several stages, which may each comprise several modules, are combined and the concentrate from a first ultrafiltration stage is not returned to a receiver, but is introduced into a second lower-capacity ultrafiltration stage. The concentrate which leaves the second stage is correspondingly introduced into an even smaller third stage which may be followed by further stages. The permeates leaving each stage are directly fed into the waste-water purifying plant. In the two process variants, the COD values of the permeates are reduced by about 20%. The permeates comprise clear liquids. The glycols and glycol derivatives which, in addition to the salt(s) and the cellulose constituent, may still be present in the residue which is obtained after distillation and which is to be treated by ultrafiltration, are not enriched in the ultrafiltration process, so that they are found in the permeate and also in the concentrate from the ultrafiltration process, as is the case with the salt. The solid residue of the concentrate, which may, for example, be obtained by spray drying of the concentrate, contains salt and the corresponding cellulose ether, for example, MHEC, as detectable components, and can be further processed. In addition to reducing the COD values of the waste water resulting from the preparation and purification of cellulose ethers, the process of the present invention makes it possible also to increase the yield of valuable material in the preparation of cellulose ethers.

The discontinuous process can be operated with one or more modules. FIG. 1 is an illustrative process using three modules. A supply tank 1 contains the residue of the distillation which includes mainly water, cellulose derivatives, medium and higher molecular weight ethylene glycol derivatives and sodium chloride. The distillation residue from the supply tank 1 is pumped via a line 2 through a preliminary filter 3 by a pump 4 towards the modules 5 via a line 6. The residue is ultrafiltered by the membranes and exits the arrangement as premeate via a line 7 and concentrate via a line 8. Temperature measuring devices 9 and pressure measuring devices 10 control operating parameters of the modules.

Figure 2:
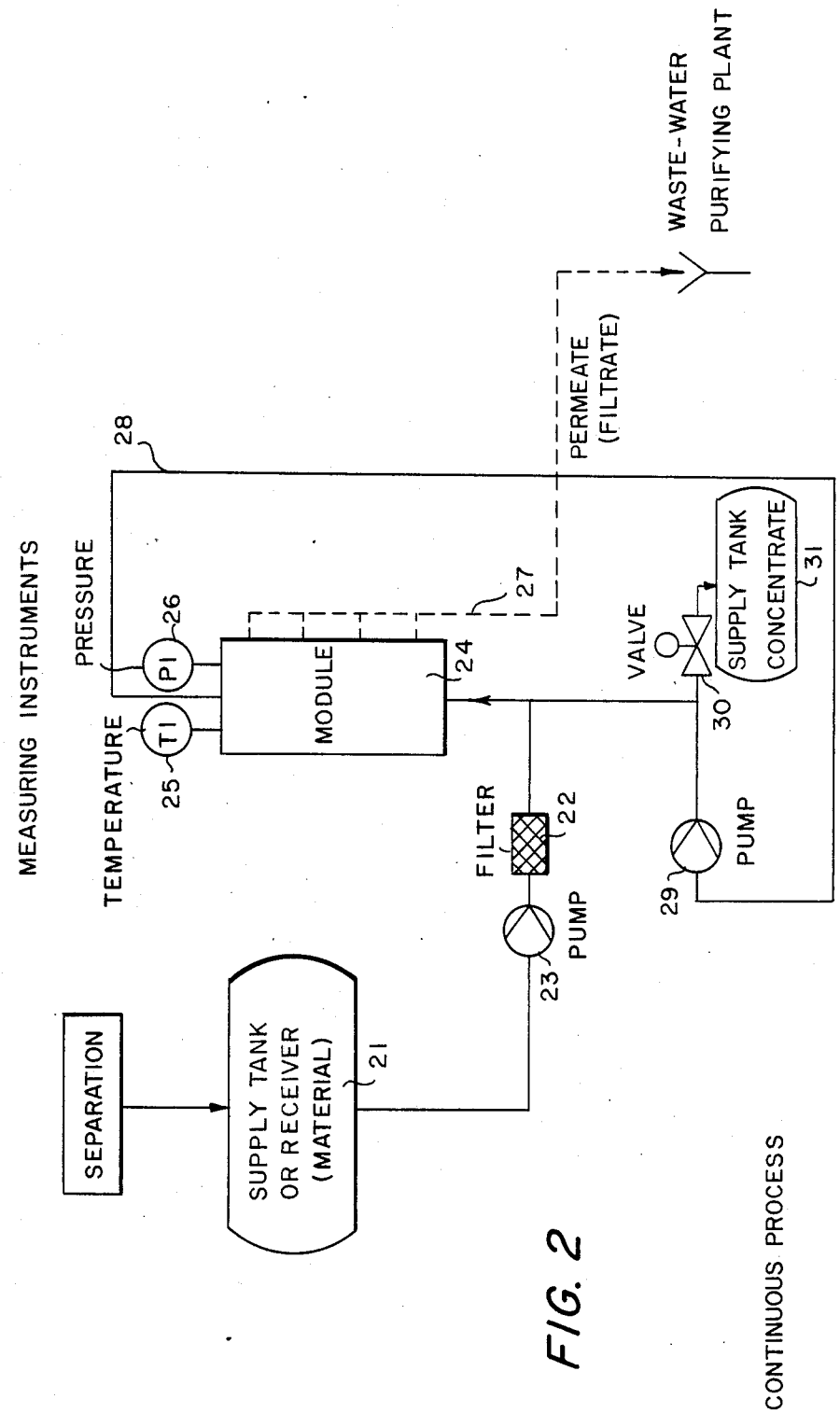
FIG. 2 is a flow diagram of a continuous process according to another embodiment of the present invention.

FIG. 2 shows one module of a single stage of a continuously working arrangement. A supply tank 21 contains the residue of the distillation. The concentrate is used in the following steps for the purpose of illustration.

Referring to FIG. 2, the residue of the distillation from the supply tank 21 is pumped through a filter 22 by a pump 23 towards a module 24. A temperature measuring device 25 and a pressure measuring device 26 control operating parameters of the module. The residue is ultrafiltered by the membranes and exits this stage as a permeate via a line 27 and concentrate via a line 28. The concentrate is then recycled through the module of this stage by a pump 29 until the desired concentrate parameters are obtained. A valve 30 is opened to enable the removal of the resultant concentrate from the recycling loop to a supply tank concentrate 31.

EXAMPLE

In the discontinuous process, three sequentially arranged plate modules for ultrafiltration are used, which have a membrane surface of 5.4 m$^2$ and comprise polyether sulfone membranes, for example, NADIR membranes, manufacturer KALLE Niederlassung der Hoechst AG, Wiesbaden, Federal Republic of Germany, which correspond to the following technical data: temperature range from 0° to 90° C., pressure range from 0 to 10 bar, pH range from 1 to 14. The waste water, i.e. the distillation residue, which is obtained from a plant for the preparation of MHEC and which is to be subjected to ultrafiltration, is placed into a receiver having a volumetric capacity of 3 m$^3$ and is introduced into the modules through a preliminary filter. After replenishing the receiver ten times and operating at a temperature of about 30° to 40° C., the amount of permeate obtained is about 28.7 m$^3$ and the amount of concentrate about 1.3 m$^3$, at an ultrafiltration time of about 140 hours and a concentration of about 1:25. This concentration is obtained by returning the concentrate which has left the third module to the receiver for repetition(s) of the ultrafiltration process. In the modules, a pressure range from about 6 to 10 bars is preferred during the ultrafiltration, in order to achieve sufficient flux. The reduction of COD values in the waste water, which is obtained in these tests, ranges from about 3.3 and 6 g of oxygen per liter. For the respective waste water this means a reduction of about 13.5 to 28.1% by weight.

When operating according to the continuous process, instead of the discontinuous process, 5 ultrafiltration stages of decreasing throughput are used, which cover a range from about 30 m$^3$/h, about 15 m$^3$/h, about 7.5m$^3$/h, about 3.75m$^3$/h down to about 1.875m$^3$/h. In this process variant, the reduction of COD values is also within the intended range (average reduction about 3.6 g of oxygen per liter, corresponding to about 21%), with the actual reduction decreasing from stage to stage.

Before carrying out ultrafiltration, the solids content of the waste water is about 6 to 7% by weight. The concentrate obtained after the procedure has a solids content of about 10 to 12% by weight, in which the proportion of organic substances amounts to about 50 to 55% by weight and the proportion of NaCl to about 45 to 50% by weight.

What is claimed is:

1. A process for the purification of liquid media comprising low-, medium-, and high-boiling organic by-products and low-, medium-, and high-boiling, residual, non-reacted organic reaction compounds produced from the preparation of cellulose ethers by the reaction of cellulose, an alkali metal hydroxide and at least one etherifying agent in a medium comprising water, comprising the steps of:

separating by distillation the low-boiling organic by-products of the reaction and residual, non-reacted, low-boiling organic reaction components from the liquid media, produced during the preparation of cellulose ethers from the reaction of cellulose, an alkali metal hydroxide and at least one etherifying agent in a medium comprising water; forming an aqueous distillation residue; and treating said aqueous distillation residue by ultrafiltration.

2. A process as claimed in claim 1, wherein said aqueous distillation residue comprises at least one salt produced from the reaction, a cellulose constituent from the reaction, the medium and high-boiling organic by-products of the reaction and the medium and high boiling non-reacted organic reaction components.

3. A process as claimed in claim 2, wherein said ultrafiltration treatment step comprises passing said aqueous distillation residue under pressure to at least one ultrafiltration module for separating said residue into a permeate having a reduced COD value and a concentrate substantially comprising said salts and said cellulose constituent.

4. A process as claimed in claim 3, comprising the further step of passing said permeate as a waste water from said module to a waste-water purifying plant.

5. A process as claimed in claim 3, wherein said ultrafiltration treatment step is performed discontinuously and comprises the sub-steps of:

passing said residue through a first module, said first module separating said residue into a first permeate and a first concentrate stream;

passing said first permeate stream as a waste water from said first module to a waste-water purifying plant;

passing said first concentrate stream to at least a second module having a size smaller than said first module, said second module separating said concentrate stream into a second permeate stream and a second concentrate stream; and passing said second permeate as a waste water from said second module to a waste-water purifying plant.

6. A process as claimed in claim 3, wherein said ultrafiltration treatment step is performed continuously and comprises the sub-steps of:

passing said residue through at least one module, said at least one module separating said residue into a permeate stream and a concentrate stream;

passing said permeate stream as a waste water from said at least one module to a waste-water purifying plant; and recycling said concentrate stream through said at least one module.

7. A process as claimed in claim 5, comprising the further sub-step of feeding concentrate stream from a last module to a receiver positioned upstream of said first module.

8. A process as claimed in claim 3, wherein said at least one module includes a membrane surface which comprises polyether sulfone.

9. A process as claimed in claim 3, wherein the pressure in said at least one module ranges from about 6 to 10 bars.

10. A process as claimed in claim 5, wherein said ultrafiltration treatment step comprises the sub-step of passing said residue through three modules, each of said modules having decreasing throughput in the downstream direction.

11. A process for the production of a cellulose ether, comprising the steps of:

reacting cellulose, an alkali metal hydroxide and at least one etherifying agent in a medium, wherein the medium is water, at least one organic solvent or a mixture of water and at least one organic solvent to form a liquid medium;

separating by distillation low-boiling organic by-products of the reaction and residual, non-reacted, low-boiling organic reaction components from the liquid medium, forming an aqueous distillation residue; and treating said aqueous distillation residue by ultrafiltration.

12. A process for the production of an alkyl-hydroxyalkyl cellulose, comprising the steps of:

reacting cellulose, an alkali metal hydroxide and at least one etherifying agent in a medium wherein the medium is water, at least one organic solvent or a mixture of water and at least one organic solvent to form a liquid medium;

separating by distillation low-boiling organic by-products of the reaction and residual, non-reacted, low-boiling organic reaction components from the liquid medium, forming an aqueous distillation residue; and treating said aqueous distillation residue by ultrafiltration.

13. A process as claimed in claim 12, whereinsaid etherifying agent is selected from the group consisting of methy chloride, ethyl chloride, ethylene oxide, propylene oxide, butylene oxide and mixtures thereof.

14. A process as claimed in claim 1, wherein the liquid media is a liquid reaction media.

15. A process as claimed in claim 1, wherein the liquid media is a washing media.

16. A process as claimed in claim 1, wherein the reaction compounds utilized in the preparation of cellulose ethers further comprise at least one organic solvent.

* * * * *

UNITED STATES PATENT AND TRADEMARK OFFICE
CERTIFICATE OF CORRECTION

PATENT NO. : 4,672,113
DATED : Jun. 9, 1987
INVENTOR(S) : WALLISCH et al.

It is certified that error appears in the above-identified patent and that said Letters Patent is hereby corrected as shown below:

IN THE CLAIMS:

Column 10, Claim 13, line 3, kindly delete "methy" and insert instead -- methyl --.

Signed and Sealed this

Fifteenth Day of December, 1987

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,672,113
DATED : June 9, 1987
INVENTOR(S) : Heinz Wallisch et al

It is certified that error appears in the above—identified patent and that said Letters Patent is hereby corrected as shown below:

On the Title Page, second inventor's name should read:

--Utz-Hellmuth Felcht--

Signed and Sealed this

Thirty-first Day of March, 1992

Attest:

HARRY F. MANBECK, JR.

*Attesting Officer*      *Commissioner of Patents and Trademarks*